(12) United States Patent
Barringer

(10) Patent No.: US 8,543,998 B2
(45) Date of Patent: Sep. 24, 2013

(54) SYSTEM AND METHOD FOR BUILDING VIRTUAL APPLIANCES USING A REPOSITORY METADATA SERVER AND A DEPENDENCY RESOLUTION SERVICE

(75) Inventor: Matthew William Barringer, Nürnberg (DE)

(73) Assignee: Oracle International Corporation, Redwood Shores, CA (US)

( * ) Notice: Subject to any disclaimer, the term of this patent is extended or adjusted under 35 U.S.C. 154(b) by 1033 days.

(21) Appl. No.: 12/369,188

(22) Filed: Feb. 11, 2009

(65) Prior Publication Data

US 2009/0300604 A1    Dec. 3, 2009

Related U.S. Application Data

(60) Provisional application No. 61/057,593, filed on May 30, 2008.

(51) Int. Cl.
*G06F 9/445* (2006.01)

(52) U.S. Cl.
USPC .......................................... 717/175; 717/169

(58) Field of Classification Search
USPC ................................. 717/178, 120
See application file for complete search history.

(56) References Cited

U.S. PATENT DOCUMENTS

| | | | |
|---|---|---|---|
| 6,480,944 B2 | 11/2002 | Bradshaw et al. | 711/162 |
| 6,690,400 B1 | 2/2004 | Moayyad et al. | 345/779 |
| 6,795,966 B1 | 9/2004 | Lim et al. | 718/1 |
| 6,895,491 B2 | 5/2005 | Kjos et al. | 711/203 |
| 6,944,860 B2 | 9/2005 | Schmidt | 718/100 |
| 7,072,807 B2 | 7/2006 | Brown et al. | 703/1 |
| 7,082,598 B1 | 7/2006 | Le et al. | 717/127 |
| 7,092,971 B2 | 8/2006 | Idei et al. | 707/200 |
| 7,143,398 B2 | 11/2006 | Chang et al. | 717/137 |
| 7,162,719 B2 | 1/2007 | Schmidt | 718/104 |
| 7,191,440 B2 | 3/2007 | Cota-Robles et al. | 718/1 |
| 7,200,530 B2 | 4/2007 | Brown et al. | 703/1 |
| 2002/0087806 A1 | 7/2002 | Gharachorloo et al. | 711/141 |
| 2003/0037320 A1* | 2/2003 | Lovvik et al. | 717/148 |
| 2003/0233494 A1 | 12/2003 | Ghosh et al. | 710/1 |
| 2004/0039728 A1* | 2/2004 | Fenlon et al. | 707/1 |
| 2004/0193807 A1 | 9/2004 | Mogi et al. | 711/137 |
| 2005/0120160 A1 | 6/2005 | Plouffe et al. | 711/1 |

(Continued)

OTHER PUBLICATIONS

White Paper—"Business Case for Virtual Appliances", How Virtual Appliances Slash Costs and Drive License Revenue, copyright 2008, rPath, Inc., www.rpath.com, 6 pages.

(Continued)

*Primary Examiner* — Li B Zhen
*Assistant Examiner* — Joanne Macasiano
(74) *Attorney, Agent, or Firm* — Osha Liang LLP

(57) ABSTRACT

A system and method for building virtual appliances using a repository metadata server and a dependency resolution service is provided. In particular, a hosted web service may provide a collaborative environment for managing origin repositories and software dependencies, whereby remote clients may follow a simple and repeatable process for creating virtual appliances. For example, the repository metadata server may cache and parse metadata associated with an origin repository, download software from the origin repository, and generate resolution data that can be used by the dependency resolution service. The dependency resolution service may then use the resolution data to resolve dependencies for a package selected for an appliance, wherein the dependencies may include packages that are required, recommended, suggested, banned, or otherwise a dependency for the selected package.

17 Claims, 4 Drawing Sheets

(56) References Cited

U.S. PATENT DOCUMENTS

| | | | |
|---|---|---|---|
| 2005/0125513 A1* | 6/2005 | Sin-Ling Lam et al. | 709/220 |
| 2005/0268338 A1 | 12/2005 | Made | 726/24 |
| 2006/0004554 A1 | 1/2006 | Vega et al. | 703/6 |
| 2006/0010440 A1 | 1/2006 | Anderson et al. | 718/1 |
| 2006/0026387 A1 | 2/2006 | Dinechin et al. | 712/1 |
| 2006/0047974 A1 | 3/2006 | Alpern et al. | 713/191 |
| 2006/0136490 A1 | 6/2006 | Aggarwal et al. | 707/103 R |
| 2006/0155749 A1 | 7/2006 | Shankar et al. | 707/102 |
| 2006/0173912 A1 | 8/2006 | Lindvall et al. | 707/104.1 |
| 2006/0256107 A1 | 11/2006 | Scarlata et al. | 345/418 |
| 2007/0033273 A1 | 2/2007 | White et al. | 709/223 |
| 2007/0283282 A1 | 12/2007 | Bonfiglio et al. | 715/762 |
| 2007/0283324 A1 | 12/2007 | Geisinger | 717/120 |
| 2007/0294676 A1 | 12/2007 | Mellor et al. | 717/139 |
| 2008/0163307 A1* | 7/2008 | Coburn et al. | 725/61 |
| 2009/0106748 A1* | 4/2009 | Chess et al. | 717/168 |
| 2009/0217263 A1* | 8/2009 | Gebhart et al. | 718/1 |

OTHER PUBLICATIONS

White Paper by Neterion, Inc.—"The Missing Piece of Virtualization™", Eliminating the I/O Bottleneck with IOV in Virtualized Servers, Written by Philippe Levy et al., Apr. 2008, 12 pages.

White Paper—"rPath® Versus Other Software Appliance Approaches", copyright 2008, rPath, Inc., www.rpath.com, 9 pages.

White Paper—"Software Appliances, Virtualization, and the Zimbra™ Collaboration Suite", Version 1.1, copyright 2007, Zimbra Inc., 9 pages.

"BMC Virtualization Management Solution Brief, Balancing Agility with Control in the Virtualized Environment", © 2008 BMC Software, Inc., Barcode No. 95159, 4 pages.

"openSUSE—KIWI Image System Cookbook", KIWI Project, Version 3.24, by Marcus Schaefer, Mar. 2, 2009, 77 pages.

"rBuilder™ and the rPath™ Appliance Platform", © 2007 rPath, Inc., www.rpath.com, 3 pages.

"rBuilder 4.1 User Guide", Version 4.1.1—Jul. 16, 2008, © 2008 rPath, Inc., www.rpath.com, 49 pages.

Virtualization: Planning the Full IT Lifecycle, White Paper Prepared for BMC Software, Apr. 2008, © 2008 Enterprise Management Associates, Inc., 12 pages.

White Paper—"Best Practices for Building Virtual Appliances", © 2008 rPath, Inc., www.rpath.com, 6 pages.

White Paper—"Virtualizing Support", Sponsored by Bomgar, by Matt Healey, Mar. 2008, © 2008 IDC, Paper No. 211403, 9 pages.

* cited by examiner

SYSTEM AND METHOD FOR BUILDING VIRTUAL APPLIANCES USING A REPOSITORY METADATA SERVER AND A DEPENDENCY RESOLUTION SERVICE

CROSS-REFERENCE TO RELATED APPLICATIONS

This application claims the benefit of U.S. Provisional Patent Application Ser. No. 61/057,593, entitled "System and Method for Managing a Virtual Appliance Lifecycle," filed May 30, 2008, the disclosure of which is hereby incorporated by reference in its entirety.

FIELD OF THE INVENTION

The invention relates to a system and method for building virtual appliances using a repository metadata server and a dependency resolution service, and in particular, to a hosted web service providing a collaborative environment for managing origin repositories and software dependencies, whereby remote clients may follow a simple and repeatable process for creating virtual appliances.

BACKGROUND OF THE INVENTION

Virtualization generally refers to the concept of running one or more virtual machines that can share resources of a physical machine across various different environments. For example, in a virtualized system, different virtual machines can execute different operating systems and/or applications on the same physical machine, regardless of underlying hardware associated with the physical machine. One advantage that virtualization can provide is the ability to create a tuned virtual appliance that includes a fully configured application image with just enough operating system (JeOS) components and/or other components needed to run a particular application. For example, an independent software vendor (ISV) may develop virtual appliances to bundle one or more applications with an operating system into a virtual machine image that can be delivered to a customer, wherein the virtual machine image may include all of the information necessary to install and configure the application. Virtualization may therefore reduce or eliminate barriers associated with different computing environments, providing ISVs with increased flexibility for reaching new markets and customers.

As such, the concept of virtualization has important implications in simplifying the production and distribution of software by reducing or eliminating the need for hardware optimization. For example, an operating system vendor may simply create a virtual appliance that includes the components of the operating system (with or without other applications), where customers may then run the operating system within a hypervisor that emulates the relevant hardware environment. Furthermore, virtual appliances may be deployed in many different ways, including in hosted environments (e.g., to deliver an application as a service), cloud computing environments (e.g., to reduce the resources needed to run an application), or various other environments. Thus, virtualization provides important advantages for ISVs that may lack particular expertise for different computing environments, as virtual appliances may provide contained systems that have been thoroughly tested and configured for a particular application. Virtual appliances may also simplify issues relating to support, security, and complexity of software products by reducing the volume of operating system components, services, and applications necessary to deliver an application to customers that may have different computational requirements.

Despite the various advantages that virtualization can provide to software providers, existing virtualization systems tend to lack a simple yet repeatable process for creating virtual appliances. For example, virtualization has faced various barriers to adoption, including the perception that specific skills are needed to develop and support virtual appliances. That is, to create a virtual appliance, developers often have to possess knowledge regarding repositories where the relevant JeOS components or other software components may be available, as well as issues pertaining to dependencies or incompatibilities among software components. Moreover, a historic problem with open source software projects is that one developer may innovate or otherwise improve upon certain aspects of a project, yet the changes that the developer implements may not necessarily be made available to upstream distributions of the project. Alternatively, the changes may not become available upstream by the time other developers have begun to work on the same features or problems. As such, existing systems for developing virtual appliances tend to lack adequate mechanisms for simplifying the management of origin repositories and relationships between software components, and further tend to lack adequate mechanisms for sharing the work and knowledge of different virtual appliance developers.

Existing systems suffer from these and other problems.

SUMMARY OF THE INVENTION

According to one aspect of the invention, a system and method for building virtual appliances using a repository metadata server and a dependency resolution service may address these and other drawbacks of existing systems. For example, as will be described in greater detail below, the invention may provide a hosted virtualization environment, which provides a unified framework for creating, building, testing, and deploying virtual appliances. Integrating the functions of creating, building, testing, and deploying virtual appliances within a unified virtualization environment may provide various synergies, including the ability to enable users to easily build and configure a virtual appliance distribution, monitor downstream changes and modifications to virtual appliances in a collaborative and user-driven manner, and provide real-time analysis and feedback during various phases of the virtual appliance lifecycle.

According to one aspect of the invention, the system for building virtual appliances may include, among other things, a repository metadata server configured to cache information associated with one or more origin repositories, including various packages stored at the origin repositories and metadata associated with the various packages. For example, in one implementation, the repository metadata server may download packages from the origin repositories, parse metadata associated with the downloaded packages, and generate resolution data files that can be used to resolve dependencies among software components retrieved from the origin repositories. Remote clients may then access the repository metadata server through a hosted virtualization environment to add, remove, update, or query the cached repositories, such that packages, patterns, or other software components available through the cached repositories may be selected for inclusion in a virtual appliance.

According to one aspect of the invention, the system for building virtual appliances may further include a dependency resolution service configured to perform dependency resolutions for the packages, patterns, or other software components selected for inclusion in the virtual appliance. In one implementation, the dependency resolution service may include one or more resolution daemons configured to perform the dependency resolutions using one or more resolution data files. For example, if a user selects a particular package for inclusion in a virtual appliance, the dependency resolution service may use the resolution data files to identify other packages that must be included or excluded from the appliance. In one implementation, the dependency resolution service may use the resolution data files generated by the repository metadata server to provide fast and scalable responses to queries from the remote clients. Further, coupling information between the dependency resolution service and the repository metadata server may ensure integrity of the repositories used to resolve dependencies.

According to one aspect of the invention, the system may include a hosted virtualization environment, wherein a remote client may access the hosted virtualization environment to develop one or more virtual appliances. For example, in one implementation, the user may create a virtual appliance from one or more "just enough operating system" (JeOS) templates, clone an appliance that the user and/or other users previously developed in the virtualization environment, or import information to create a new appliance. The user may then develop the selected template, the cloned appliance, and/or the new appliance within an editing interface. In one implementation, the repository metadata server may cache information associated with one or more origin repositories that provide a source of software for appliance. For example, the repository metadata server may contact the origin repositories to retrieve metadata describing the origin repositories and software contained therein. The metadata may be used to populate a repository database that can be queried by the user, and further to build resolution data files that can be provided to the dependency resolution service. Additionally, the repository metadata server may queue the packages and patterns contained in the origin repositories for download into one or more cached repositories. As such, the user may query the repository database to retrieve or otherwise access the packages and patterns contained in the origin repositories (e.g., through the cached repositories associated with the repository metadata server).

According to one aspect of the invention, the user may query the repository database to browse and/or search the origin repositories known to the repository metadata server in order to manage software for the virtual appliance (e.g., the user may select packages, patterns, or other software to be included in the appliance, and may further ban packages, patterns, or other software from the appliance). For example, in addition to populating the repository database using the metadata associated with the packages, patterns, or other software downloaded from the origin repositories, the repository metadata server may further scan the downloaded software to discover additional information describing the software (e.g., system user names, services such as Apache or PostgreSQL, etc.). As such, the repository database may respond to queries from the user relating to the additional information. In one implementation, browsing and/or searching the repository database may be filtered according to active origin repositories selected by the user, subsets of the active origin repositories, and/or all origin repositories available known to the repository metadata server. Additionally, information relating to the origin repositories selected by the user may be merged with the appliance to provide dynamic control over updating the appliance (e.g., the user may subsequently be notified that the origin repositories used to build the appliance have been updated). In response to the user selecting one or more packages, patterns, or other components for the appliance, the selected components may be retrieved from the cached repositories and added to the virtual appliance, or the selected components may be added to the download queue if the components have not yet been downloaded to the cache.

According to one aspect of the invention, in response to the user selecting and/or banning software for the appliance, the dependency resolution service may analyze various dependencies for the selected and/or banned software. For example, any particular package may include metadata describing, among other things, other packages that are required for the package to operate properly, other packages that are recommended (but not required) for the package to operate optimally, other packages that are suggested (but not required) to enhance the package's functionality, and other packages that conflict (and thus cannot be installed) with the package. As such, if the user selects a particular package to be included in the appliance, the dependency resolution service may introspectively scan metadata associated with the selected package to obtain a complete manifest of dependent packages, wherein the user may be notified if other packages are required for the selected package, other packages selected for the appliance conflict with the selected package, or other relevant dependencies are identified.

According to one aspect of the invention, the repository metadata server may support various functions for interacting with the dependency resolution service. For example, the repository metadata server may register active resolution daemons associated with the dependency resolution service and push resolution data associated with the origin repositories to the registered resolution daemons. As such, if a user selects and/or bans one or more packages for the appliance, the dependency resolution service may initiate one or more of the active resolution daemons to identify software that is dependent, recommended, suggested, and/or conflicting for the selected and/or banned package. For example, the active resolution daemons may scan the resolution graphs for annotations or metadata explicitly describing dependencies for the package, pre-installation and post-installation scripts for the package to determine what the scripts are configured to do, and/or content associated with the package.

According to one aspect of the invention, if a user adds a particular package to the appliance that requires other packages to be installed, the required packages or components may be automatically added to the appliance. Further, any packages already included in the appliance that conflict with the added package may be removed from the appliance to resolve the conflict. In one implementation, if the added package has recommended and/or suggested dependencies, such dependencies may be presented for the user to determine whether or not to include the recommended and/or suggested packages. Alternatively (or additionally), the recommended and/or suggested packages may be automatically added and the user enabled to determine whether or not to remove the recommended and/or suggested packages that were automatically added.

According to one aspect of the invention, an impact analysis engine may analyze any changes to the appliance caused by the selection of software for the appliance, the banning of software for the appliance, and/or the resolution of dependencies. Information relating to an impact of the changes may then be presented to the user within a user interface (e.g., displaying a list of packages added to or deleted from the appliance, a data impact on the appliance expressed in terms of megabytes, gigabytes, etc.). Additionally, the dependency resolution service and/or the impact analysis engine may provide the user with error correction capabilities, wherein if a change to an appliance causes an error, inconsistency, or other issue that cannot be fixed automatically, a warning or other notification may be provided within the user interface together with one or more options or recommendations for correcting the issue.

According to one aspect of the invention, after the user has selected the packages, patterns, or other software components to be included in the appliance, the user may configure and personalize a build for the appliance. For example, the user may configure the appliance to establish various settings for the appliance, and may personalize the appliance to establish various images to be used for the appliance. The user may then build a bootable image of the appliance, wherein the user with specify a name for the image, a format for the image, a version number for the image, or other options for the image. In one implementation, one or more virtual machines may be launched to provide a contained environment for building the appliance, allowing a plurality of remote clients to build images of appliances and otherwise work within the hosted virtualization environment in a substantially simultaneous and independent manner. In addition, building the image within a contained virtual machine may preserve resources associated with the virtualization environment that may needed for activities being performed various remote clients. After the image of the appliance has been built, the user may deploy the appliance for execution in one or more runtime environments (e.g., the user may download the image for execution in a local runtime environment, load the image within a contained runtime environment hosted in the virtualization environment, etc.).

Other objects and advantages of the invention will be apparent to those skilled in the art based on the following drawings and detailed description.

DETAILED DESCRIPTION

Figure 1:
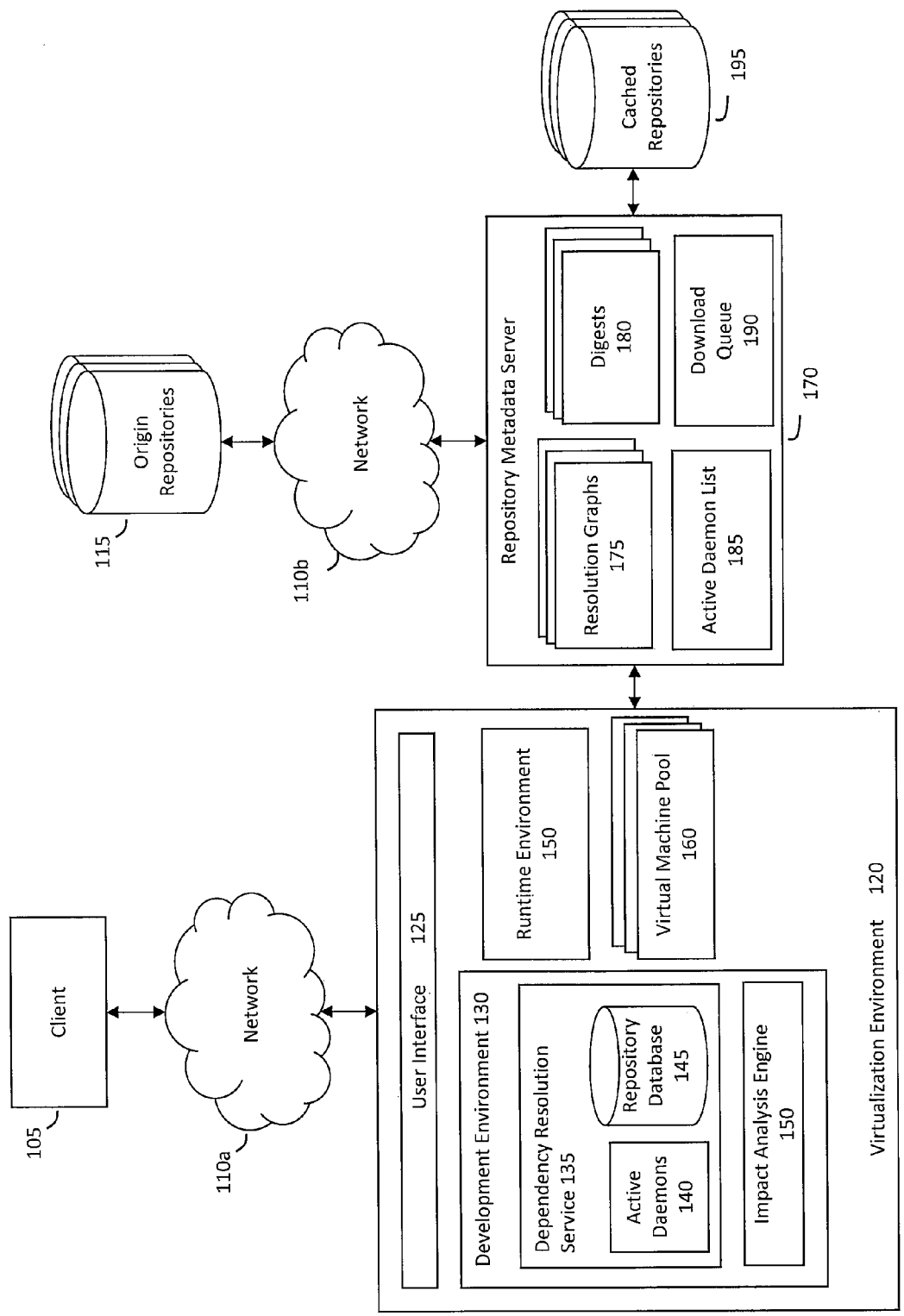
FIG. 1 illustrates a block diagram of an exemplary system for building a virtual appliance using a repository metadata server and a dependency resolution service, according to one aspect of the invention.

According to one aspect of the invention, FIG. 1 illustrates an exemplary system for building a virtual appliance using, among other things, a repository metadata server 170 and a dependency resolution service 135. In particular, the system illustrated in FIG. 1 may include a virtualization environment 120, which provides a unified framework for developing, building, testing, deploying, and otherwise managing virtual appliances. Integrating the functions of developing, building, testing, deploying, and otherwise managing virtual appliances within the unified virtualization environment 120 may provide various synergies, including the ability to enable users to easily build and configure a virtual appliance distribution, monitor downstream changes and modifications to virtual appliances in a collaborative and user-driven manner, and provide real-time analysis and feedback during various phases of the virtual appliance lifecycle.

In one implementation, the virtualization environment 120 may be provided as a hosted service, wherein a remote client 105 may access the virtualization environment 120 over a network 110a to develop one or more virtual appliances. The remote client 105 may then access a development environment 130, which may include a create mode enabling a user of the remote client 105 to develop one or more virtual appliances. In particular, when the user initiates the create mode, a development interface may be launched within a user interface 125, wherein the development interface may provide various options for the user to develop one or more virtual appliances.

For example, in one implementation, the development interface may provide the user with an option to create a virtual appliance from one or more "just enough operating system" (JeOS) templates, which generally include core components, packages, patterns, or other information for creating a virtual appliance that has a minimal operating system footprint. If the user selects the option to create a virtual appliance from the JeOS templates, various JeOS templates available in the development environment 130 may then be presented to the user for selection within the user interface 125. For example, the user may select a particular one of the JeOS templates to create a virtual appliance that includes a general purpose Linux operating system, which may or may not include additional components (e.g., various ones of the JeOS templates may provide no graphical interface, a minimal graphical interface, a GNOME or KDE desktop environment, or other components in addition to the general purpose Linux operating system). As such, the development environment 130 may create an appliance having one or more components corresponding to the template selected by the user and subsequently load the appliance for editing by the user within the user interface 125.

In one implementation, the development interface may further provide the user with an option to clone an appliance that the user and/or other users previously developed in the virtualization environment 120. For example, in one implementation, the development environment 130 may include provide access to any appliances that the user previously developed in addition to a marketplace having various appliances that the user and/or other users of the virtualization environment 120 have published for public access. As such, any appliances that the user previously developed and/or the published appliances available in the marketplace may be presented to the user for selection within the user interface 125. Thus, the user may select an appliance previously developed in the virtualization environment 120, wherein the development environment 130 may create a clone of the selected appliance and subsequently load the cloned appliance for editing by the user within the user interface 125.

In one implementation, after an appliance template and/or a cloned appliance has been loaded for editing within the user interface 125, the create mode may further enable the user to select various packages, patterns, files, and other software components to be included in the appliance. For example, in one implementation, the repository metadata server 170 may be configured to cache information associated with one or more origin repositories 115, wherein the cached information may include packages and patterns contained in the origin repositories 115 and metadata describing the origin repositories 115 and the packages and patterns contained in the origin repositories 115 (e.g., packages may generally include distributions of related software components and descriptive metadata such as a full name, version number, vendor, and dependencies for the software, and patterns may generally include reusable descriptions or templates for solutions that address recurring problems in software design). As such, the user may access the repository metadata server 170 to add, remove, update, or otherwise query information associated with one or more of the origin repositories 115. For example, the repository metadata server 170 may communicate with the remote client 105 and the origin repositories 115 using function calls associated with XML-RPC, SOAP, local UNIX pipes, a custom communication implementation, or other communication mechanisms to enable the user to select packages, patterns, or other software components contained in the origin repositories 115.

For example, in one implementation, the create mode may provide the user with an option to add a new origin repository 115, wherein the user may define a name for the new origin repository 115 and further provide a location where information for the new origin repository 115 can be obtained. The repository metadata server 170 may then contact the new origin repository 115 using the location provided by the user and retrieve metadata describing the new origin repository 115 and any packages and patterns contained therein. In one implementation, the metadata retrieved from the origin repositories 115 may be used to build resolution data files that can be provided to the dependency resolution service 135 (e.g., the resolution data files may include resolution graphs 175 that can be pushed to active resolution daemons 140 in an active daemon list 185). The repository metadata server 170 may insert the metadata describing the new origin repository 115 and the packages and patterns contained therein into a repository database 145 coupled to the dependency resolution service 135, thereby enabling the user to access the packages and patterns contained in the origin repository 115 through the development environment 130. Additionally, the repository metadata server 170 may build a queue 190 of packages and patterns to be downloaded from the origin repository 115 and subsequently download the packages and patterns in the queue 190 to one or more cached repositories 195.

In one implementation, the create mode may further provide the user with an option to select one or more of the origin repositories 115 available through the repository metadata server 170, wherein the selected repositories 115 may provide a source of software that can be included in the virtual appliance. For example, the user may query the repository database 145 to view information relating to the origin repositories 115 available through the repository metadata server 170 (including any repositories 115 added by the user), or the user may search the repository database 145 to identify one or more origin repositories 115 having a particular name, a particular type, or particular software (e.g., the user may enter a search string of "Apache" to search the repository database 145 for origin repositories 115 that contain one or more Apache packages). As such, if the user selects one or more of the origin repositories 115 to be a source of software for the virtual appliance, the repository metadata server 170 may enable the user to access the packages and patterns contained in the selected origin repositories 115 (e.g., by downloading the packages and patterns to the cached repositories 195 and enabling the user to retrieve the downloaded packages and patterns from the cached repositories 195).

In one implementation, to provide reliable responses to queries from the remote client 105, the repository metadata server 170 may be configured to ensure that the cached repositories 195 maintain an updated cache of the origin repositories 115. For example, if a user requests information relating to a particular origin repository 115, the repository metadata server 170 may compare a local digest 180 for the origin repository 115 to a current digest for the origin repository 115 (e.g., the digest may represent a metadata signature for the origin repository 115, wherein any changes to the origin repository 115 may result in a change to the digest or metadata signature for the origin repository 115). Alternatively (or additionally), the repository metadata server 170 may compare the local digests 180 for one or more of the origin repositories 115 to current digests for the origin repositories 115 according to a schedule, which may be predetermined, user-defined, or configured in various other ways. As such, if the local digest 180 for the origin repository 115 matches the current digest for the origin repository 115, the repository metadata server 170 may determine that the cached repositories 195 are current for the origin repository 115. However, if the local digest 180 for the origin repository 115 does not match the current digest, the repository metadata server 170 may follow the procedures described above for adding a new origin repository 115 in order to update the outdated cache of the origin repository 115.

In one implementation, the user may interact with the repository metadata server 170 in various ways to manage software for a virtual appliance. For example, the repository metadata server 170 may be queried to obtain a real-time status of the origin repositories 115, including whether a particular origin repository 115 is currently being added, updated, or deleted. The user may also browse the origin repositories 115 in various ways to select software to be included in the virtual appliance. For example, software in the origin repositories 115 may be organized into various software groups, wherein the user may browse the groups to select packages, patterns, or other software components that provide specific functionality (e.g., the groups may be organized based on functionality for operating systems, development, games, graphics, multimedia, office suites, systems, servers, networking, desktop environments, etc.). The user may also provide criteria for searching the origin repositories 115 to identify packages, patterns, or other software components that match the search criteria.

As such, the repository database 145 may enable the user to browse and/or search the software contained in the origin repositories 115 in order to manage software for a virtual appliance (e.g., the user may select packages, patterns, or other software to be included in the appliance, and may further ban packages, patterns, or other software from the appliance). For example, in addition to populating the repository database using the metadata associated with the packages, patterns, or other software downloaded from the origin repositories, the repository metadata server may further scan the downloaded software to discover additional information describing the software (e.g., system user names, services such as Apache or PostgreSQL, etc.). As such, the repository database may respond to queries from the user relating to the additional information. In one implementation, browsing and/or searching of the repository database 145 may be filtered according to active origin repositories 115 selected by the user, subsets of the active origin repositories 115, and/or all origin repositories 115 known to the repository metadata server 170. Additionally, information relating to the origin repositories 115 selected by the user may be merged with the appliance to provide dynamic control over updating the appliance (e.g., the appliance may be automatically updated in response to an update to an active origin repository 115 or an update to a relevant package contained in the active origin repository 115, or a message may be sent to the user that such an update is available, etc.).

In one implementation, to assist the user in making selections relating to the packages, patterns, or other software available in the origin repositories 115, the software may be associated with a popularity measure based on activity in the virtualization environment 120. For example, a user may search the repository database 145 for a particular package, and packages matching the search may be ranked based on their popularity in the virtualization environment 120 (e.g., the popularity measures may provide a metric for users to distinguish among different packages based on selections of other users). Additionally, in one implementation, a trust measure may be provided for one or more of the origin repositories 115 and/or software contained therein, wherein the trust measure may provide the user with information identifying trusted software or origin repositories 115. In particular, the repository metadata server 170 may provide an interface for an authorized user (e.g., an administrator) to interact with or otherwise manage one or more cryptographic keys used to determine whether a particular package or origin repository 115 is "trusted" or "untrusted." For example, if the repository metadata server 170 downloads a particular package signed with a cryptographic key (e.g., a PGP certificate) from a particular origin repository 115, the cryptographic key may be validated to mark the particular package or origin repository 115 as trusted or untrusted (e.g., if the cryptographic key indicates that the package originates from a trusted provider or partner, the package or repository 115 may be marked "trusted," or if the cryptographic key indicates that the package originates from an unknown source, which may or may not be malicious, the package or repository 115 may be marked "untrusted").

In one implementation, in response to the user selecting one or more packages, patterns, or other components for the appliance, the selected components may be retrieved from the cached repositories 195 and added to the virtual appliance. However, if the selected components have not yet been downloaded to the cached repositories 195, the repository metadata server 170 may add the selected components to the download queue 190. In one implementation, the repository metadata server 170 dynamically reorder the download queue 190 to prioritize necessary components (e.g., if a user adds a new origin repository 115 or selects a component yet to be downloaded to the cached repositories 195, the download queue 190 may be reordered to prioritize downloading of the selected components). Additionally, the user may query the repository metadata server. 170 to obtain information relating to the status of the download queue 190 (e.g., the status may identify a current package or other component being downloaded, a number of packages or other components remaining in the download queue 190, or other information relating to the downloading of software from the origin repositories 115 to the cached repositories 195).

In one implementation, in response to the user selecting and/or banning software for the appliance, the dependency resolution service 135 may analyze various dependencies for the selected and/or banned software. For example, any particular package may include metadata describing, among other things, other packages that are required for the package to operate properly, other packages that are recommended (but not required) for the package to operate optimally, other packages that are suggested (but not required) to enhance the package's functionality, and other packages that conflict (and thus cannot be installed) with the package. As such, if the user selects a particular package to be included in the appliance, the dependency resolution service 135 may introspectively scan metadata associated with the selected package to obtain a complete manifest of dependent packages, wherein the user may be notified if other packages are required for the selected package, other packages selected for the appliance conflict with the selected package, or other relevant dependencies are identified.

In one implementation, the repository metadata server 170 may support various functions for interacting with the dependency resolution service 135. For example, the repository metadata server 170 may be configured to register one or more active resolution daemons 140 associated with the dependency resolution service 135, wherein an active daemon list 185 containing the registered resolution daemons 140 may be stored at the repository metadata server 170. As such, when the repository metadata server 170 adds, updates, or deletes information associated with one or more of the origin repositories 195, the repository metadata server 170 may push information associated with the origin repositories 195 to the dependency resolution service 135, wherein the dependency resolution service 135 may ensure that the repository database 145 contains current information for the origin repositories 195. In addition, the repository metadata server 170 may use metadata retrieved from the origin repositories 195 to create one or more resolution graphs 175 that define dependencies for the packages contained in the origin repositories 195, wherein the resolution graphs 175 may be pushed to the registered active daemons 140 for use when resolving dependencies for software that the user has selected and/or banned from the appliance. Thus, by sharing information relating to the origin repositories 195 and the resolution graphs 175 between the dependency resolution service 135 and the repository metadata server 170, the development environment 130 may ensure the integrity of the origin repositories 195 used to resolve dependencies.

As such, if a user selects and/or bans one or more packages, patterns, or other software components for the appliance, the dependency resolution service 135 may initiate one or more of the active resolution daemons 140 to identify software that is dependent, recommended, suggested, and/or conflicting for the selected and/or banned software. For example, to resolve dependencies for a particular package, the active resolution daemons 140 may scan the resolution graphs 175 for annotations or metadata explicitly describing dependencies for the package. In addition, the active resolution daemons 140 may further scan pre-installation and post-installation scripts for the package to determine configurations for the scripts (e.g., a script may be configured to execute a command relating to a dependent package, and may further scan content associated with the package to introspectively identify dependencies (e.g., based on documentation included in the package).

Thus, if a user adds a particular package to the appliance, the dependency resolution service 135 may identify any other packages or components that the package may require, and the required packages or components may then be automatically added to the appliance (e.g., if the user adds a server package, packages needed to authenticate users, manage a file system, or perform other tasks required for proper operation may be automatically added). Further, the dependency resolution service 135 may identify any packages already included in the appliance that conflict with the added package, and the conflicting packages may be removed from the appliance to resolve the conflict. In one implementation, if the added package has recommended and/or suggested dependencies, such dependencies may be presented to the user through the user interface 125, wherein the user may determine whether or not to include the recommended and/or suggested packages. Alternatively (or additionally), the development environment 130 may be configured to automatically add the recommended and/or suggested packages and enable the user to determine whether or not to remove the recommended and/or suggested packages that were automatically added.

In one implementation, the dependency resolution service 135 may further include an impact analysis engine 150, which may analyze any changes to the appliance caused by the resolution of dependencies and populate the user interface 125 with information relating to an impact of the changes. For example, in one implementation, the impact analysis engine 150 may provide a notification of the impact within the user interface 125 (e.g., displaying a list of packages added to or deleted from the appliance, an impact on the appliance in terms of an amount of data, which may be quantified in megabytes, gigabytes, or otherwise, etc.). Additionally, the dependency resolution service 135 and/or the impact analysis engine 150 may provide the user with error correction capabilities (e.g., where a change to an appliance causes an error, inconsistency, or other issue that cannot be fixed automatically, a warning or other notification may be provided within the user interface 125 together with options or recommendations for the user to correct the issue).

In the context of the unified framework of the virtualization environment 120, the dependency resolution service 135 may be configured to perform dependency resolutions in response to requests received from the remote client 105 (e.g., requests to add or ban packages from an appliance, requests to return dependency information, etc.). In addition, the dependency resolution service 135 may provide a user at the remote client 105 with options to customize various aspects of an appliance created in the development environment 130. For example, user interfaces, menus, and other components of the appliance may be customized around installed and dependent packages only (e.g., if a user interface package is selected, "just enough UI" may be installed to support user interface elements relevant to the installed and dependent packages). In addition, the development environment 130 may provide the user with an undo option to modify the automatic addition or banning of packages (e.g., the user may remove added dependent packages, override banned packages to permit their installation, etc.). Further, when the user removes a package or other component from the appliance, the dependency resolution service 135 may resolve dependencies for the removed package or other component to identify packages that were installed based on a dependency for the removed package (e.g., to automatically remove unnecessary software and ensure that the appliance footprint remains as small as possible).

In one implementation, after the user has selected the packages, patterns, or other software components to be included in the appliance, the user may configure and personalize a build for the appliance. For example, the user may configure the appliance to establish settings for language, keyboard layout, time zone, network configuration, firewall status, identity management, login preferences, database configuration, storage and memory, or various other settings. In another example, the user may further configure the appliance based on the metadata or other information the repository metadata server discovers in relation to the software (e.g., the user may configure specific services associated with software included in the appliance, such as a Postgres database). Additionally, the user may personalize the appliance to establish an image to be used as an appliance logo, icon, login background, desktop background, among other things.

In one implementation, after the user has configured and personalized the appliance, the user may initiate a build for the appliance. In particular, the development environment 130 may provide the user with an option to build a bootable image of the appliance, wherein the user with specify a name for the image, a format for the image (e.g., a hard disk or USB disk image, a live CD or DVD .iso image, a VMware or Xen virtual machine image, etc.), a version number for the image, an origin of the image (e.g., a base appliance that was cloned and derived to create the appliance), or other options for the image build. The development environment 130 may then launch one or more virtual machines contained in a virtual machine pool 160 to build the image of the appliance. In particular, building the appliance within the virtual machine launched from the virtual machine pool 160 may provide a contained build environment, allowing a plurality of remote clients 105 to build appliance images within the hosted virtualization environment 120 in a substantially simultaneous and independent manner. In addition, building the image within a contained virtual machine may preserve resources associated with the virtualization environment 120 that may needed for activities being performed various remote clients 105.

In one implementation, after the image of the appliance has been built, the user may deploy the appliance for execution in one or more runtime environments. For example, the user may download the appliance image to the remote client 105 to execute the appliance in an appropriate runtime environment at the remote client 105. Alternatively (or additionally), the virtualization environment 120 may provide the user with an option to load the appliance image within a runtime environment 150 associated with the virtualization environment 120. For example, the virtualization environment 120 may be configured to launch one of the virtual machines in the virtual machine pool 160 and execute the launched virtual machine within the runtime environment 150. The appliance image may then be loaded within the virtual machine in the runtime environment 150, wherein the user may execute the appliance, test the appliance, or otherwise interact with the appliance within the runtime environment 150.

Figure 2:
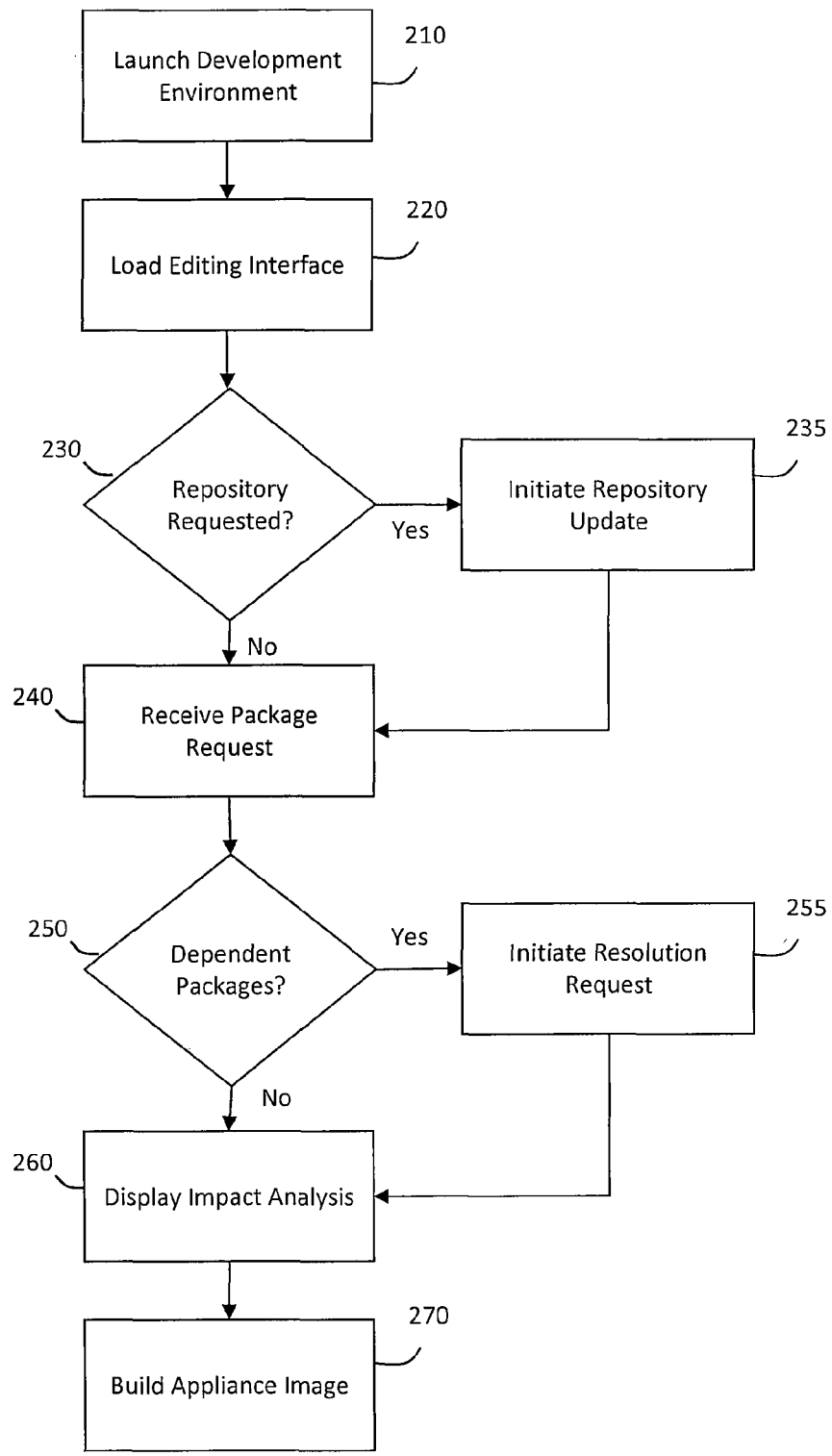
FIG. 2 illustrates a flow diagram of an exemplary method for building a virtual appliance using a repository metadata server and a dependency resolution service, according to one aspect of the invention.

According to one aspect of the invention, FIG. 2 illustrates an exemplary method for building a virtual appliance using a repository metadata server and a dependency resolution service. In particular, the method illustrated in FIG. 2 may be used to build a virtual appliance image using, among other things, a repository metadata server and a dependency resolution service. In particular, the method illustrated in FIG. 2 may begin in an operation 210, wherein a remote client may launch a development environment, which may enable a user of the remote client to develop one or more virtual appliances. For example, after launching the development environment in operation 210, the user may select a JeOS template to create a virtual appliance having a minimal operating system footprint. Alternatively, the user may select an appliance that the user and/or other users previously developed in the development environment to create a clone of the selected appliance. As such, in response to the user selecting a JeOS template or cloning a previously developed appliance, an operation 220 may include loading an editing interface for the user to further develop the selected template and/or the cloned appliance.

In one implementation, after an appliance template and/or a cloned appliance has been loaded for editing within the editing interface, the user may access the repository metadata server to add, remove, update, or otherwise query information associated with one or more origin repositories managed by the repository metadata server. As such, an operation 230 may include determining whether the user has requested to add, remove, update, or otherwise query information associated with one or more of the origin repositories. If the user provides a request relating to one or more of the origin repositories, an operation 235 may include initiating an update of the one or more requested repositories.

For example, if the user requests addition of a new origin repository in operation 230, the user may define a name and/or location for the origin repository. The repository metadata server may then contact the new origin repository using the information provided by the user and retrieve metadata describing the new origin repository and packages and patterns contained therein. The repository metadata server may further insert the metadata associated with the new origin repository into a repository database, thereby enabling the user to query information relating to the packages and patterns contained in the origin repository. Additionally, the repository metadata server may download the packages and patterns contained in the origin repository into one or more local cached repositories to enable the user to access the packages and patterns contained in the origin repository, and may further build resolution data files for packages and patterns contained in the origin repository to enable the dependency resolution service to resolve dependencies in response to the user selecting one or more of the packages and patterns.

Alternatively (or additionally), the user may select one or more of the origin repositories available through the repository metadata server in operation 230, wherein the selected repositories may provide a source of software that can be included in the virtual appliance. For example, the user may query the repository database to view information relating to the origin repositories available through the repository metadata server (including any repositories added by the user), or the user may search the repository database to identify origin repositories having a particular name, a particular type, or particular software (e.g., the user may enter a search string of "Apache" to search the repository database for origin repositories that contain one or more Apache packages). As such, if the user selects one or more of the origin repositories to be a source of software for the virtual appliance, the repository metadata server may update the selected origin repositories in operation 230 to enable the user to access the packages and patterns contained in the selected origin repositories (e.g., updating the selected repositories may include updating the repository database to include current metadata for the selected repositories, downloading updated packages and patterns contained in the selected repositories to the cached repositories, and/or building updated resolution data files for the selected repositories if digests for the selected repositories are outdated).

In one implementation, after the user has selected the origin repositories to be used as a source of software for the virtual appliance, an operation 240 may include receiving a request from the user relating to one or more packages, patterns, files, and other software components for the appliance. For example, the user may browse the repository database according to one or more software groups to locate packages, patterns, or other software components that provide specific functionality (e.g., the groups may be organized based on functionality for operating systems, development, games, graphics, multimedia, office suites, systems, servers, networking, desktop environments, etc.). The user may also provide criteria to search the repository database for origin repositories that contain packages, patterns, or other software components that match the search criteria. As such, operation 240 may include the user requesting one or more packages, patterns, or other software to be included in the virtual appliance, and may further include the user requesting one or more packages, patterns, or other software to be banned from the appliance. In one implementation, browsing and/or searching the repository database may be filtered according to the origin repositories requested by the user in operation 230, or all of the origin repositories known to the repository metadata server, or in other ways, as will be apparent.

In one implementation, in response to the user selecting and/or banning software for the appliance in operation 240, the dependency resolution service may resolve dependencies for the selected and/or banned software in an operation 250. For example, any particular package selected by the user may include metadata describing related packages that are required for the selected package to operate properly, related packages that are recommended (but not required) for the selected package to operate optimally, related packages that are suggested (but not required) to enhance the functionality of the selected package, and/or related packages that conflict (and thus cannot be installed) with the selected package. As such, if the user selects a particular package to be included in and/or banned from the appliance, the dependency resolution service may scan the metadata associated with the selected package in operation 250 to determine whether the selected package has one or more dependencies.

In one implementation, if the selected package is determined to have one or more dependencies, the dependency resolution service may then initiate a resolution request in an operation 255. For example, the dependency resolution service may use the information in the repository database describing the origin repositories and/or one or more resolution graphs or other resolution data built by the repository metadata server to identify dependencies for the selected package. As such, operation 255 may include the dependency resolution service invoking an active resolution daemon to identify software that is dependent, recommended, suggested, and/or conflicting for the selected and/or banned software. For example, to resolve dependencies for a particular package, the active resolution daemon may scan the resolution graphs to identify annotations or metadata explicitly describing dependencies for the package, pre-installation and post-installation scripts for the package to identify configurations for the scripts, and/or content associated with the package to introspectively identify dependencies (e.g., based on documentation included in the package). Thus, if the particular package is determined to have one or more dependencies, operation 255 may automatically add to the appliance any required dependencies and automatically remove from the appliance any packages that conflict with the particular package. Additionally, in one implementation, operation 255 may include automatically adding any recommended and/or suggested dependencies, or the user may optionally be notified of such dependencies to enable the user to control whether or not to include the recommended and/or suggested dependencies.

In one implementation, after the user has selected and/or banned a particular package from the appliance in operation 250 and after any dependencies for the particular package have been resolved in operation 255, an impact analysis engine may analyze any changes to the appliance resulting from operations 250 and/or 255 and notify the user of the impact in an operation 260 (e.g., displaying a list of packages added to or deleted from the appliance, a data impact on the appliance in terms of megabytes, gigabytes, etc.). Additionally, the impact analysis displayed in operation 260 may provide the user with error correction capabilities (e.g., where a change to an appliance causes an error, inconsistency, or other issue that cannot be resolved automatically, a warning or other notification may be displayed together with one or more options or recommendations for correcting the issue).

In one implementation, after the user has selected the packages, patterns, or other software components to be included in and/or banned from the appliance, the user may build an image for the appliance in an operation 270. For example, in operation 270, the user may configure the build to establish settings for the image relating to language, keyboard layout, time zone, network configuration, firewall status, identity management, login preferences, database configuration, storage and memory, or various other settings. Additionally, the user may personalize the build for the image in operation 270 to select a logo, icon, login background, desktop background, or otherwise personalize the image. In one implementation, operation 270 may then include building a bootable image of the appliance, wherein the user may specify a name for the image, a build format for the image, a version number for the image, an origin of the image (e.g., a base appliance that was cloned and derived to create the appliance), or other options for the build. One or more virtual machines may then be launched to create the appliance image within a contained build environment, and the user may then deploy the appliance image for execution in one or more runtime environments (e.g., the user may download the appliance image for execution in a local runtime environment, load the appliance image within a hosted runtime environment, etc.).

Figure 3:
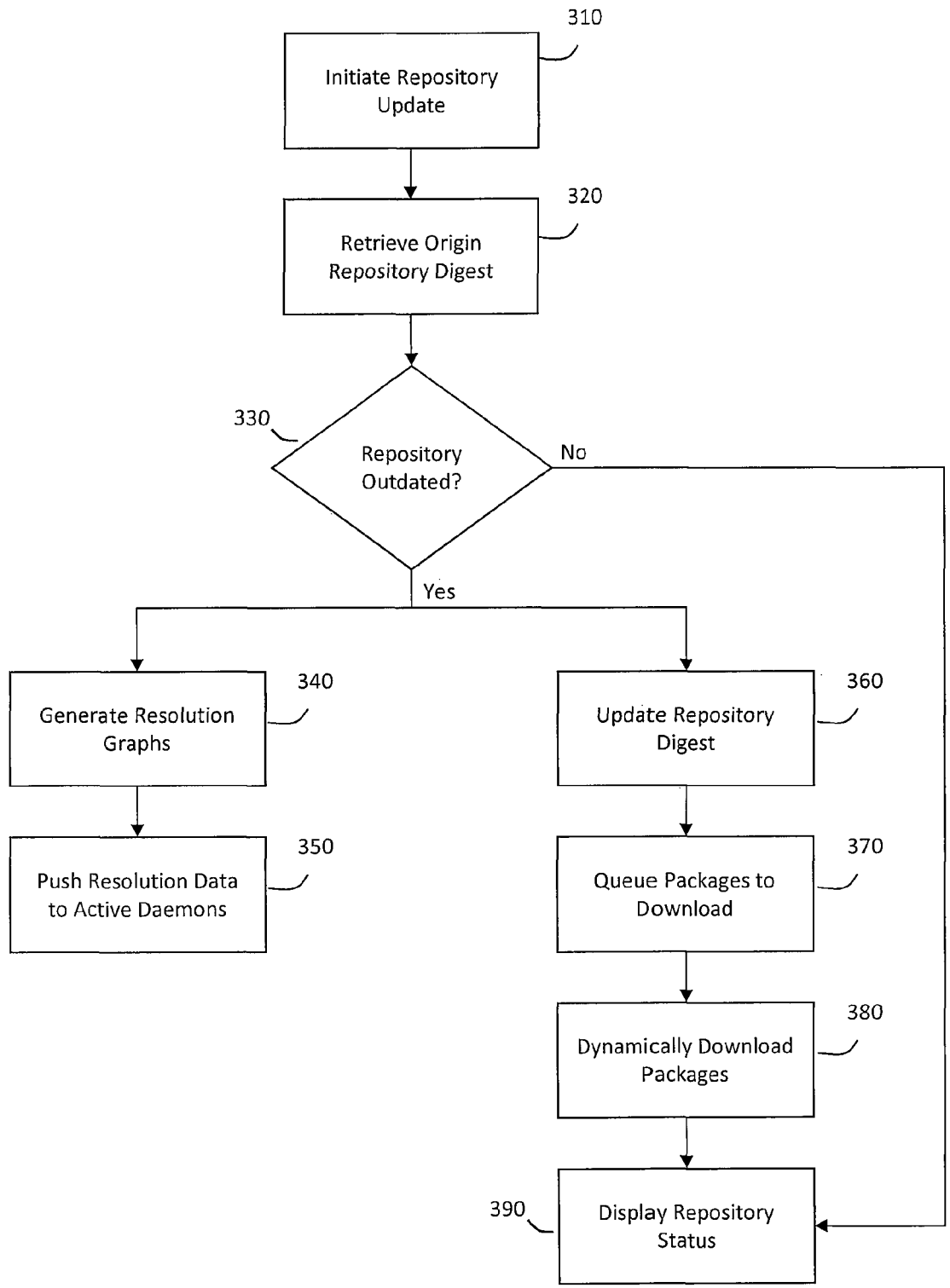
FIG. 3 illustrates a flow diagram of an exemplary method for updating repository information using a repository metadata server, according to one aspect of the invention.

According to one aspect of the invention, FIG. 3 illustrates an exemplary method for updating repository information using a repository metadata server. In particular, the method illustrated in FIG. 3 may be used to ensure that the repository metadata server can provide reliable responses to queries from remote clients. For example, in one implementation, the repository metadata server may perform the method described herein to maintain an updated repository database describing one or more origin repositories, and further to maintain an updated cache containing software associated with the origin repositories. For example, if a user of the remote client requests information relating to a particular origin repository, the repository metadata server may initiate an update for the origin repository in an operation 310. Alternatively (or additionally), the repository metadata server may initiate the update in operation 310 according to a particular schedule, which may be predetermined, user-defined, or configured in various other ways.

In one implementation, to ensure that the cache for the origin repository is current, the repository metadata server may contact the origin repository to retrieve a current digest for the origin repository. For example, the digest may provide a unique metadata signature for a current version of the origin repository (e.g., an MD5 checksum, SHA hash value, etc.), wherein any changes to the origin repository or packages, patterns, or other software contained therein may result in a change to the digest. If the repository metadata server has not previously retrieved a digest for the origin repository, the origin repository may then be considered new or otherwise outdated in an operation 330, in which case information for the repository may be obtained in subsequent operations 340-390. If the repository metadata server has previously retrieved information for the particular origin repository, operation 330 may include comparing the current digest to a digest previously retrieved for the origin repository. If the current digest matches the previously retrieved digest, the repository may be considered current, in which case the repository update process may end after displaying a current status of the repository in operation 390. Otherwise, if the current digest does not match the previously retrieved digest, the repository may be considered outdated, in which case current information for the repository may be obtained in subsequent operations 340-390.

For example, in one implementation, an operation 360 may include the repository metadata server adding the current digest for the origin repository to the repository database. As such, operation 360 may include the repository metadata server recording the current digest and other metadata describing the current version of the origin repository in the repository database, thereby enabling an administrator or other authorized user to view a history of the origin repository. For example, the repository database may contain names of origin repositories managed by the repository metadata server, a current MD5 checksum, SHA hash value, or other digest for each of the origin repositories, and names, versions, dependencies, licenses, and/or other metadata describing the current version of each of the origin repositories. The administrator or other authorized user may then view different versions of the origin repositories using an interface provided by the repository metadata server (e.g., to troubleshoot an origin repository that becomes misconfigured or otherwise causes problems for one or more users).

In one implementation, the repository metadata server may further use the metadata retrieved from the origin repository to build one or more resolution data files in an operation 340, wherein the resolution data files may be provided to the dependency resolution service. For example, operation 340 may include generating one or more resolution graphs based on the dependency metadata retrieved for the packages contained in the origin repository. The resolution graphs may then be pushed to one or more active resolution daemons associated with the dependency resolution service in an operation 350, whereby the resolution graphs and other information relating to the origin repository may enable the dependency resolution service to ensure the integrity of the origin repository when subsequently resolving dependencies.

In addition to providing metadata and other information relating to the origin repository to the dependency resolution service, packages and patterns contained in the origin repository may be queued for download to the cached repositories in an operation 370. The repository metadata server may then dynamically download the packages and patterns in the queue to the cached repositories in an operation 380, thereby enabling the user to access the packages and patterns contained in the origin repository. For example, if a user selects one or more of the packages, patterns, or other software components in the origin repository to be included in an appliance, operation 380 may include adding the selected components to the download queue and dynamically reordering the download queue to prioritize necessary components. As such, a user can add a package to the appliance and build an image of the appliance prior to package actually being downloaded to the cached repositories (i.e., the download queue may be reordered to prioritize the packages necessary for the image). Alternatively (or additionally), after the selected components have been downloaded to the cached repositories, the selected components may be retrieved from the cached repositories and then added to the appliance.

Additionally, in one implementation, the user may query the repository metadata server to obtain information relating to a status of the download queue, wherein an operation 390 may include identifying a current package or other component being downloaded, a number of packages or other components remaining in the download queue, or other information relating to the downloading of software from the origin repositories to the cached repositories. In one implementation, operation 390 may further include displaying other types of status information requested for the origin repository, including information relating to packages and patterns contained therein (e.g., in response to a query of the repository database), information relating to whether the repository is outdated, being added, deleted, or updated, or other information relating to the origin repository.

Figure 4:
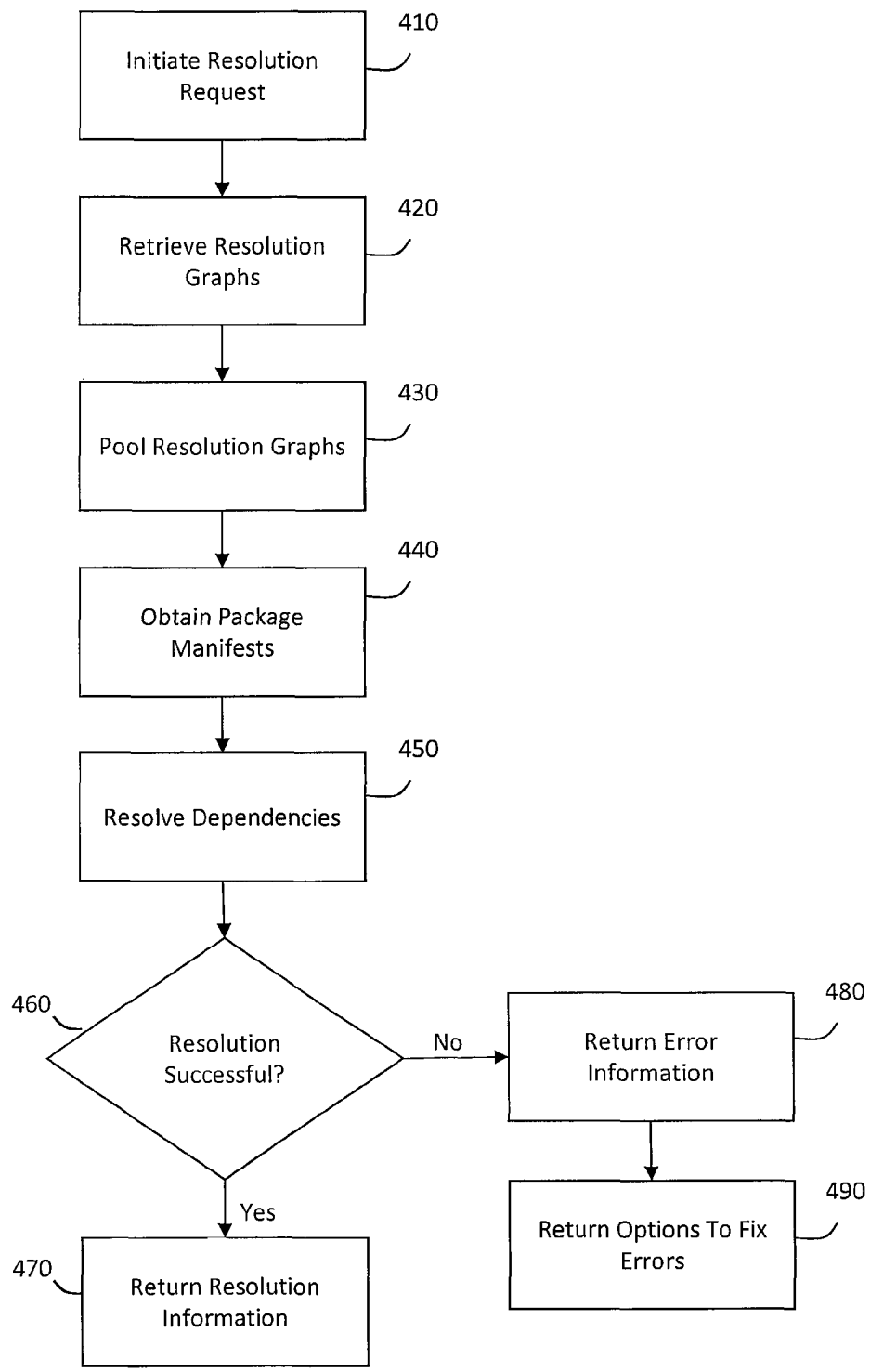
FIG. 4 illustrates a flow diagram of an exemplary method for resolving software dependencies using a dependency resolution service, according to one aspect of the invention.

According to one aspect of the invention, FIG. 4 illustrates an exemplary method for resolving software dependencies using a dependency resolution service. In particular, the method illustrated in FIG. 4 may be used to ensure that all potential dependencies among various packages a user has selected for an appliance have been resolved prior to launching a process to build an image of the appliance. For example, if a user selects a package for an appliance and the selected package requires other packages to be installed in order to function properly, or if the selected packages cannot function properly if certain other packages are installed, the method described herein may be used to identify the dependencies and provide a real-time response to the user. In addition, the dependency resolution service may perform various operations to be described herein to respond to queries from remote clients while further using resolution data derived from remote origin repositories.

In one implementation, a resolution request may be initiated in an operation 410 in response to the user selecting one or more packages to be included in and/or banned from the appliance. For example, the dependency resolution service may be associated with a development environment that enables the user to select packages, patterns, or other components to be included in the appliance, wherein the resolution request may include information relating to the selection (e.g., names and versions of packages that have been selected for installation, names and versions of packages that have been banned from installation, specific origin repositories from which the packages should be retrieved, etc.).

As such, in one implementation, operation 410 may include contacting a repository metadata server to determine whether one or more origin repositories containing the selected packages are new or updated (i.e., to ensure the integrity of the origin repositories and prevent giving the user invalid dependency results). For example, the dependency resolution service may maintain a local repository database (e.g., a SQLite database) containing names of various origin repositories managed by the repository metadata server and a current MD5 checksum, SHA hash value, or other digest representing a version of each of the origin repositories. As such, the dependency resolution service may compare information that the repository metadata server returns for the origin repositories to the information in the repository database, wherein operation 410 may further include initiating a request for the repository metadata server to update one or more of the origin repositories that appear to be outdated.

In one implementation, after ensuring the integrity of the relevant origin repositories, an operation 420 may include registering one or more active resolution daemons with the repository metadata server, wherein the registered resolution daemons may receive one or more resolution graphs from the repository metadata server. The resolution graphs may define dependencies for various packages contained in the origin repositories, wherein the repository metadata server may use metadata retrieved from the origin repositories to compile information defining the resolution graphs and the dependencies contained therein. For example, the repository metadata server may locally store binary data for the resolution graphs in a cache, wherein operation 420 may include pushing the resolution graphs to the resolution daemons in response to one or more resolution graphs being added or updated in the cache. As such, operation 420 may further include the repository metadata server notifying the dependency resolution service to add, update, or delete any previously retrieved resolution graphs (e.g., in response to constructing new resolution graphs for packages from a new origin repository, constructing updating resolution graphs for packages from a known origin repository, etc.).

In one implementation, the resolution daemons may then read the resolution graphs for each of the origin repositories in an operation 430, wherein the resolution daemons may combine the various resolution graphs into a pool and obtain a complete manifest for each of the packages associated with the resolution request in an operation 440. For example, the manifest for any particular package may include metadata describing, among other things, other packages that are required for the package to operate properly, other packages that are recommended (but not required) for the package to operate optimally, other packages that are suggested (but not required) to enhance the package's functionality, and other packages that conflict (and thus cannot be installed) with the package. In addition, the manifest may further include one or more pre-installation scripts for the package, one or more post-installation scripts for the package, and/or content of the package (e.g., libraries, packages, or other components included in the package).

In an operation 450, the resolution daemons may then analyze the pooled resolution data to resolve dependencies among all of the specified packages (e.g., using functions associated with the libsatsolver application for resolving package dependencies, available through the openSUSE Build Service). If the resolution is determined to have been successful in an operation 460, the resolution information may be returned in an operation 470 (i.e., to an entity that initiated the request in operation 410). In particular, the resolution information returned in operation 470 may include any packages that must be installed for the packages subject to the resolution request, the origin repositories where the packages that must be installed should be retrieved from, and version information for the packages that must be installed. Alternatively (or additionally), the resolution information returned in operation 470 may include packages that cannot be installed with the packages subject to the resolution request, wherein such packages may be removed from an appliance if the conflicting package is installed. Further, the resolution information may include recommended and/or suggested dependent packages, wherein such dependencies may optionally be added to the appliance.

Otherwise, if the resolution is determined to have been unsuccessful in operation 460, an operation 480 may include returning information relating to a specific error, inconsistency, or other issue that caused the resolution to fail. In addition, one or more warnings, options, or recommendations for correcting the issue may be returned in an operation 490 (e.g., notifying the user that a package banned from the appliance should not be banned because another package may be dependent thereon, notifying the user to install a package in order to remedy an inconsistency, etc.).

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method for building a virtual appliance using a repository metadata server and a dependency resolution service, comprising:
   retrieving first metadata from a first origin repository, wherein the first metadata includes metadata describing the first origin repository and further includes metadata describing first software packages in the first origin repository;
   retrieving second metadata from a second origin repository, wherein the second metadata includes metadata describing the second origin repository and further includes metadata describing second software packages in the second origin repository;
   downloading the first software packages and the second software packages to one or more cached repositories, wherein the repository metadata server is configured to enable a user to select software packages from the first software packages and the second software packages for a virtual appliance;
   building a first resolution graph from the metadata describing the first software packages, wherein the first resolution graph specifies dependencies between the first software packages in the first origin repository;
   building a second resolution graph from the metadata describing the second software packages in the second origin repository, wherein the second resolution graph specifies dependencies between the second software packages;
   combining the first resolution graph and the second resolution graph to obtain pooled resolution data;
   receiving a selection for a first software package from the first software packages and a second software package from the second software packages;
   resolving dependencies between the first software package and the second software package by analyzing the pooled resolution data; and
   building an image for the virtual appliance comprising the first software package and the second software package based on the dependencies resolved by the dependency resolution service.

2. The method of claim 1, further comprising storing the metadata for the first software packages in a repository database, wherein the user can query the repository database to select the first software package.

3. The method of claim 1, wherein the metadata for the first software packages further includes a digest for the first origin repository, wherein the digest provides a unique metadata signature for a current version of the first origin repository.

4. The method of claim 3, further comprising comparing the digest for the first origin repository to a previously retrieved digest for the first origin repository.

5. The method of claim 4, wherein the first software packages are downloaded to the one or more cached repositories if the digest does not match the previously retrieved digest, and wherein the first resolution graph is built if the digest does not match the previously retrieved digest.

6. The method of claim 1, wherein the metadata for the first software packages is retrieved from the first origin repository in response to a request sent using one selected from a group consisting of a predetermined schedule and a user-defined schedule.

7. The method of claim 1, wherein the first software packages are downloaded to the one or more cached repositories according to a download queue, wherein the repository metadata server is further configured to reorder the download queue to prioritize the first software package selected by the user.

8. The method of claim 1, wherein the first resolution graph further specifies conflicts between the second software packages.

9. The method of claim 1, wherein the dependency resolution service is further configured to resolve the dependencies using at least one selected from a group consisting of a pre-installation script, a post-installation script and content associated with the first software package and the second software package.

10. A system for building a virtual appliance, comprising:
   a processor
   a repository metadata server, executing on the processor, configured to:
      retrieve first metadata from a first origin repository, wherein the first metadata includes metadata describing the first origin repository and further includes metadata describing first software packages in the first origin repository;
      retrieve second metadata from a second origin repository, wherein the second metadata includes metadata describing the second origin repository and further includes metadata describing second software packages in the second origin repository;
      download the first software packages and the second software packages to one or more cached repositories;
      enable a user to select the software contained in the origin repositories in relation to a virtual appliance; and
      build a first resolution graph from the metadata describing the first software packages, wherein the first resolution graph specifies dependencies between the first software packages in the first origin repository;
      build a second resolution graph from the metadata describing the second software packages in the second origin repository, wherein the second resolution graph specifies dependencies between the second software packages;
      combine the first resolution graph and the second resolution graph to obtain pooled resolution data and receive a selection for a first software package from the first software packages and a second software package from the second software packages;

a dependency resolution service configured to resolve dependencies between the first software package and the second software package by analyzing the pooled resolution data; and a development environment configured to build an image for the virtual appliance comprising the first software package and the second software package based on the dependencies resolved by the dependency resolution service.

11. The system of claim 10, wherein the repository metadata server is further configured to store the metadata for the first software packages in a repository database, wherein the user can query the repository database to select the first software package appliance.

12. The system of claim 10, wherein the metadata for the first software packages further includes a digest for the first origin repository, wherein the digest provides a unique metadata signature for a current version of the first origin repository.

13. The system of claim 12, wherein the repository metadata server is further configured to compare the digest for the first origin repository to a previously retrieved digest for the first origin repository, wherein the repository metadata server downloads the first software packages to the one or more cached repositories and builds the first resolution graph if the digest if does not match the previously retrieved digest.

14. The system of claim 10, wherein the repository metadata server is configured to retrieve the metadata for the first software packages from the first origin repository in response to a request sent using one selected from a group consisting of a predetermined schedule and a user-defined schedule.

15. The system of claim 10, wherein the repository metadata server is configured to download the first software package to the one or more cached repositories according to a download queue, wherein the repository metadata server is further configured to reorder the download queue to prioritize the first software package selected by the user.

16. The system of claim 10, wherein the first resolution graph further specifies conflicts between the second software packages.

17. The system of claim 10, wherein the dependency resolution service is further configured to resolve the dependencies using at least one selected from a group consisting of a pre-installation script, a post-installation script, and content associated with the first software package and the second software package.

\* \* \* \* \*

UNITED STATES PATENT AND TRADEMARK OFFICE
CERTIFICATE OF CORRECTION

| | | |
|---|---|---|
| PATENT NO. | : 8,543,998 B2 | Page 1 of 1 |
| APPLICATION NO. | : 12/369188 | |
| DATED | : September 24, 2013 | |
| INVENTOR(S) | : Barringer | |

It is certified that error appears in the above-identified patent and that said Letters Patent is hereby corrected as shown below:

In the Claims

In column 20, line 35, in Claim 9, delete "script" and insert -- script, --, therefor.

In column 20, line 67, in Claim 10, delete "data" and insert -- data; --, therefor.

In column 21, line 17, in Claim 11, delete "package appliance." and insert -- package. --, therefor.

Signed and Sealed this
Twenty-fifth Day of February, 2014

Michelle K. Lee
*Deputy Director of the United States Patent and Trademark Office*